S. T. NELSON.
EJECTOR FOR WELLS.
APPLICATION FILED AUG. 8, 1913.
1,151,529.
Patented Aug. 24, 1915.
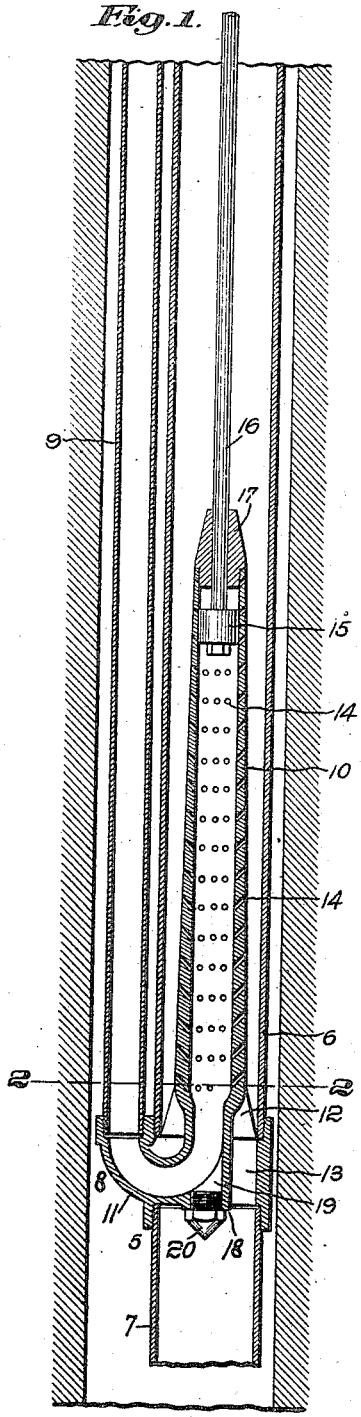
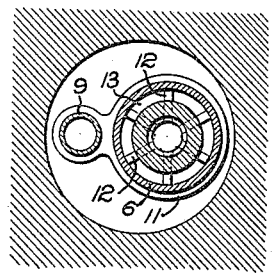
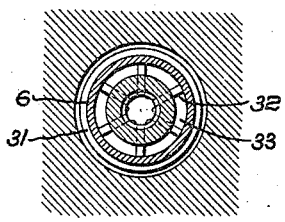
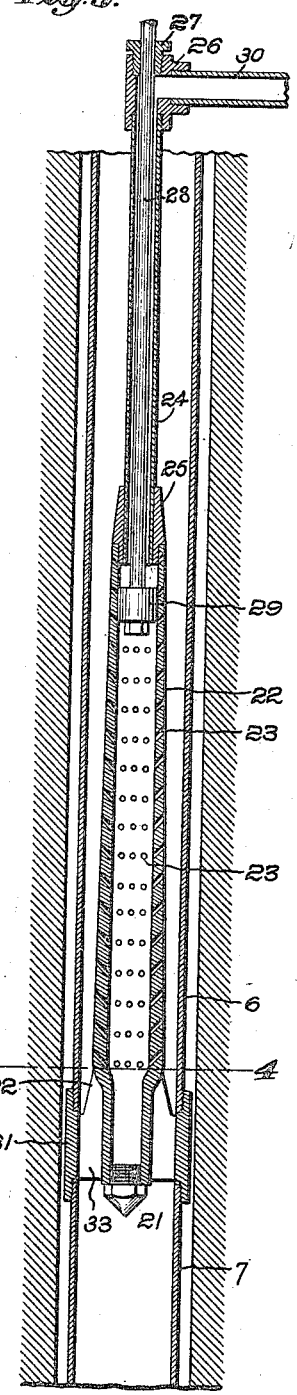
Witnesses:
Horace A. Crossman
Carl L. Choate
Inventor:
Sven T. Nelson

UNITED STATES PATENT OFFICE.

SVEN T. NELSON, OF OAK PARK, ILLINOIS, ASSIGNOR, BY MESNE ASSIGNMENTS, TO SULLIVAN MACHINERY COMPANY, OF BOSTON, MASSACHUSETTS, A CORPORATION OF MASSACHUSETTS.

EJECTOR FOR WELLS.

1,151,529. Specification of Letters Patent. Patented Aug. 24, 1915.

Application filed August 8, 1913. Serial No. 783,675.

*To all whom it may concern:*

Be it known that I, SVEN T. NELSON, a citizen of the United States, and a resident of Oak Park, in the county of Cook and State of Illinois, have invented an Improvement in Ejectors for Wells, of which the following description, in connection with the accompanying drawings, is a specification, like characters on the drawings representing like parts.

This invention relates to ejectors, and more especially to that class of ejectors commonly called air lifts or water elevators, employed for the purpose of utilizing pressure fluid, such as compressed air or steam, to create a suction in the water conduit, thereby to raise water from subterranean or other reservoirs.

My invention will be best understood by reference to the following specification, when taken in connection with the accompanying drawings of two specific embodiments thereof, while the scope will be more particularly pointed out in the appended claims.

In the drawings: Figure 1 is a central, vertical section of one form of air lift or water elevator embodying my invention; Fig. 2 is a sectional view on line 2—2 of Fig. 1; Fig. 3 is a central, vertical section of another form of air lift or water elevator embodying my invention; and Fig. 4 is a sectional view on line 4—4 of Fig. 3.

Referring to the drawings and to the embodiments of my invention which I have there disclosed for illustrative purposes, I have there shown a so-called air lift or water elevator, comprising a liquid conduit designated generally by the numeral 5. This conduit comprises a well-casing, herein having two pipes 6 and 7 threaded or otherwise appropriately secured into the upper and lower ends respectively of a body, herein in the form of a casting, constituting what may be termed a head. This well-casing is inserted in an upright position, in the customary manner, in the ground and water enters thereinto from the bottom. The head may be placed at such height in the well as circumstances require.

Referring to the form shown in Figs. 1 and 2, I have there shown a pressure fluid conduit, designated generally by the numeral 8, including a pipe 9 which in practice will extend to the surface of the ground and be connected to an appropriate source of pressure fluid supply, as for example an air compressor.

The pressure fluid supply conduit has a terminal portion 10, within the well-casing and preferably co-axially disposed with respect thereto. While this terminal portion may be otherwise appropriately formed, it is herein formed as a part of a casting 11 whose body portion is interposed between the upper and lower pipe sections 6 and 7 of the well-casing, and is provided with a laterally extending elbow into which the pressure fluid supply pipe 9 is threaded. Herein the terminal portion of the conduit is supported in a central position by a plurality of webs 12, between which are passages 13 permitting the flow of water in an upward direction within the well-casing about the terminal portion 10.

The terminal portion 10 is provided with a large number of perforations 14 herein placed at different points longitudinally of the terminal portion and preferably drilled thereinto obliquely so as to direct the streams of pressure fluid in an upward direction, thereby to furnish as great lifting power as possible.

In order that the number of perforations affording communication between the inlet of the pressure fluid conduit and the liquid conduit may be varied I may provide any suitable means, but herein the perforated portion of the pressure fluid conduit constitutes a cylinder, within which a piston 15 is mounted to slide longitudinally. This piston is provided with an upwardly extending piston rod 16, guided in a plug 17 threaded or otherwise suitably secured in the upper end of the terminal portion 10. This piston rod is intended to extend to a convenient point at the surface of the ground, where it will be provided with appropriate means for moving the same vertically thereby to change the vertical position of the piston within its cylinder.

For convenience in manufacture, the casting 11 is herein provided with a central boss 18, having an aperture 19 into which is threaded a plug 20. This aperture allows the core to be supported at both ends when the casting is being made, and it also permits the introduction of a boring bar used in machining the inside of the perforated terminal portion.

When the apparatus is placed in operation the piston may be adjusted to suit the conditions under which the apparatus is operating. For example, assuming that the air pressure remains substantially constant, the output of the well can be varied by raising or lowering the piston, thereby varying the number of perforations affording communication between the inlet of the pressure fluid conduit and the liquid conduit. This is especially convenient where there are several wells operated by one air compressor, in which case the quantity of air supplied to each well can be varied while still maintaining the air pressure substantially constant. By this means the volume of air can be gaged exactly to the output of the well.

It is found in practice that the best results are secured by maintaining the air pressure substantially constant and at the proper pressure in proportion to the depth of the well. By varying the position of the piston it is possible to determine the point at which the greatest efficiency of the well can be secured; that is to say, in experimenting with a well the piston is placed at its highest point, the output of the well is then measured, and the volume of air supplied to the well is also measured. The piston is then lowered and the volume of air supplied to the well is again measured and the output of water also measured. These trials may continue until the most advantageous position is found with reference to the quantity of water raised and the volume of air used.

In some cases the diameter of a well is so small that there is insufficient space on the outside of the well-casing for the pressure fluid conduit, and in such cases I prefer to employ the construction shown in Figs. 3 and 4. Referring to this construction, I have shown a pressure fluid conduit 21, placed centrally within the well-casing and having a terminal portion 22 provided with perforations 23 similar to those described in connection with the first form. Herein the upper portion of the pressure fluid conduit is in the form of a pipe 24, threaded or otherwise appropriately secured in a plug 25, the latter in turn being threaded or otherwise suitably secured in the upper end of the terminal portion 22. The upper end of the pipe 24 may be threaded into a fitting 26 having a gland 27 constituting a guide for a piston rod 28 having secured to its lower end a piston 29 mounted to slide within the terminal portion 22. The fitting 26 may be in the form of a T, having an inlet 30 for the pressure fluid, which will enter the cylinder through the annular space between the piston rod and the pipe 24.

In this embodiment of my invention the terminal portion of the pressure fluid conduit is in the form of a casting 31 interposed between the upper and lower pipe sections of the well-casing, and is provided with a plurality of webs 32 between which are passages 33 permitting the flow of water in an upward direction about the sides of the terminal portion of the pressure fluid conduit.

The operation of this form or embodiment of my invention is very similar to that of the form previously described, the exception being that in the second form the pressure fluid enters at the top of the terminal portion and consequently the number of perforations affording communication between the pressure fluid conduit and the liquid conduit is increased by lowering the piston, whereas in the first form the number is increased by raising the piston.

While I have herein shown and described two forms or embodiments of my invention for illustrative purposes, and have disclosed and discussed in detail the construction and arrangement incidental to two specific applications thereof, it is to be understood that the invention is limited neither to the mere details or relative arrangements of parts nor to its specific applications herein shown, but that extensive deviations from the illustrated forms or embodiments of the invention may be made without departing from the principles thereof.

Having thus described two embodiments of my invention, what I claim is:

1. An apparatus of the class described comprising, in combination, a liquid conduit, a pressure-fluid supply conduit having a terminal portion within the liquid conduit provided with a longitudinal series of perforations, and means for varying the number of such perforations affording communication between the inlet of the pressure-fluid conduit and the liquid conduit by alternately opening and closing said perforations successively by axial movement of said means past said perforations successively.

2. An apparatus of the class described comprising, in combination, a liquid conduit, a pressure-fluid supply conduit having a terminal portion within said liquid conduit provided with a longitudinal series of perforations at different points longitudinally of the same, and longitudinally movable means for varying the number of such perforations affording communication between the inlet of the pressure-fluid conduit and the liquid conduit by movement of said means longitudinally of and past succeeding perforations from end to end of said series.

3. An apparatus of the class described comprising, in combination, a liquid conduit, a pressure-fluid supply conduit having a terminal portion within said liquid conduit provided with a plurality of perforations at different points longitudinally of the same, a piston mounted to slide longitudinally within said terminal portion, and means to slide said piston longitudinally past said perforations successively.

4. An apparatus of the class described comprising, in combination, a liquid conduit, a pressure-fluid supply conduit having a terminal portion within said liquid conduit provided with a plurality of perforations at different points longitudinally of the same, a piston mounted to slide longitudinally within said terminal portion, and a piston rod guided by said pressure-fluid conduit.

5. An apparatus of the class described comprising, in combination, a liquid conduit, a pressure-fluid supply conduit having a terminal portion within said liquid conduit provided with a plurality of perforations at different points longitudinally of the same, a piston mounted to slide longitudinally within said terminal portion, and a piston rod guided by said pressure-fluid conduit at a point adjacent said terminal portion.

6. An apparatus of the class described comprising, in combination, a well-casing including upper and lower pipe sections, an interposed device secured thereto and having a cylinder within said well-casing provided with a plurality of perforations, a pressure-fluid supply pipe communicating with said cylinder, and a piston mounted to move longitudinally within said cylinder.

7. An apparatus of the class described comprising, in combination, a well-casing including upper and lower pipe sections, an interposed device secured thereto and having a cylinder supported by webs within said casing and provided with a plurality of perforations at different points in its length, a pressure-fluid supply pipe communicating with said cylinder, and a piston mounted to move longitudinally within said cylinder.

8. An apparatus of the class described comprising, in combination, the liquid conduit 5 comprising upper and lower sections 6 and 7, the pressure-fluid conduit 8 comprising the pipe 9 and casting 11 having the terminal portion 10 constituting a cylinder provided with the perforations 14, and the piston 15 and piston rod 16 mounted to slide in said cylinder.

In testimony whereof, I have signed my name to this specification, in the presence of two subscribing witnesses.

SVEN T. NELSON.

Witnesses:
 E. A. GUESTEN,
 F. C. PFISTER.

Copies of this patent may be obtained for five cents each, by addressing the "Commissioner of Patents, Washington, D. C."